Figure 1:
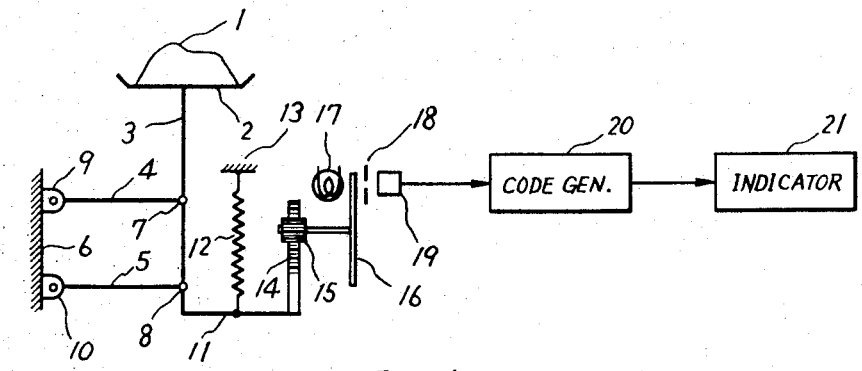

United States Patent
Yamanaka et al.

[15] 3,698,493
[45] Oct. 17, 1972

[54] DIGITAL BALANCE

[72] Inventors: Masami Yamanaka, Miki; Takashi Aga, Akashi, both of Japan

[73] Assignee: Yamato Scale Company, Limited, Akashi-shi, Japan

[22] Filed: Dec. 29, 1971

[21] Appl. No.: 213,569

[30] Foreign Application Priority Data

June 7, 1971 Japan ..................... 46/40021

[52] U.S. Cl. ........................................ 177/3, 177/25
[51] Int. Cl. ............................................. G01g 23/38
[58] Field of Search ......... 177/3, 12, 178, 25, DIG. 1, 177/DIG. 3, DIG. 6

[56] References Cited

UNITED STATES PATENTS 3,163,247  12/1964  Bell et al. ...................... 177/3
3,276,526  10/1966  Loshbough .................... 177/3
3,447,617  6/1969  Susor et al. .................... 177/3
3,453,422  7/1969  Susor .......................... 177/3 X Primary Examiner—Richard B. Wilkinson
Assistant Examiner—George H. Miller, Jr.
Attorney—Eugene E. Geoffrey, Jr.

[57] ABSTRACT

A digital balance having a code generator and indicating means for displaying the weight of a commodity and other related information in digital form which includes a gate and a memory circuit between the code generator and indicating means, a device for comparing the output of the code generator with the output of the memory circuit and a timer connected between the comparing device and the gate to operate said gate and feed a signal to the memory device when a condition of non-coincidence exists for a predetermined period of time.

2 Claims, 5 Drawing Figures

DIGITAL BALANCE

This invention relates to a digital balance and more specifically to a novel and improved digital balance for preventing fluctuation of the output codes.

Digital balances wherein the measured weight is indicated in digital fashion have come into general use because of the convenience of direct indication. Such known digital balances generally comprise a mechanical weighing mechanism, a photoelectric encoding mechanism, a code generator and an indication device. In such systems, however, since a position of the moving member of the weighing mechanism is instantaneously converted into a digital code and indicated by the indication device, the digital indication fluctuates with the sway of the cradle of the balance and this action is both undesirable and unavoidable. Such fluctuation is especially evident when it is caused by a shock or sudden wind and often makes it impossible to read or print the measured value correctly. In order to avoid this difficulty, it has been suggested that the weighing mechanism of the balance be provided with a vibration damper or shock absorber. Although the fluctuation of indication could be avoided by such means, however, the responding speed of the balance is materially reduced and the time required for the weighting operation is substantially increased.

Accordingly, an object of this invention resides in the provision of a device for preventing fluctuation of the output codes of a digital balance without reducing its responding speed.

The above object can be attained in accordance with this invention by providing, between the code generator and the indication device, a normally closed gate coupled to the output of the code generator, a memory coupled between the gate and the indication device for temporarily storing the output code of the gate before indicated by the indication device, a comparator for comparing the output codes of the code generator and the memory and producing an output when a difference is sensed between the both output codes, and a timer for initiating operation in response to the output of the comparator and supplying a gating signal to the gate after a predetermined time.

These and other features of this invention will be described further in detail hereinunder with reference to the accompanying drawings.

Figure 3:
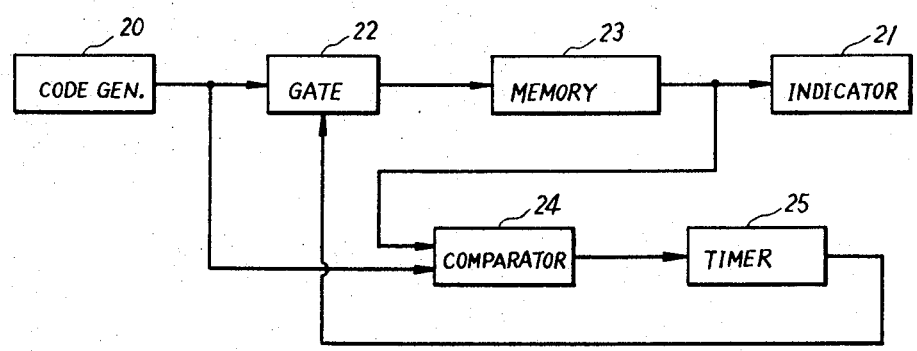
Figure 4:
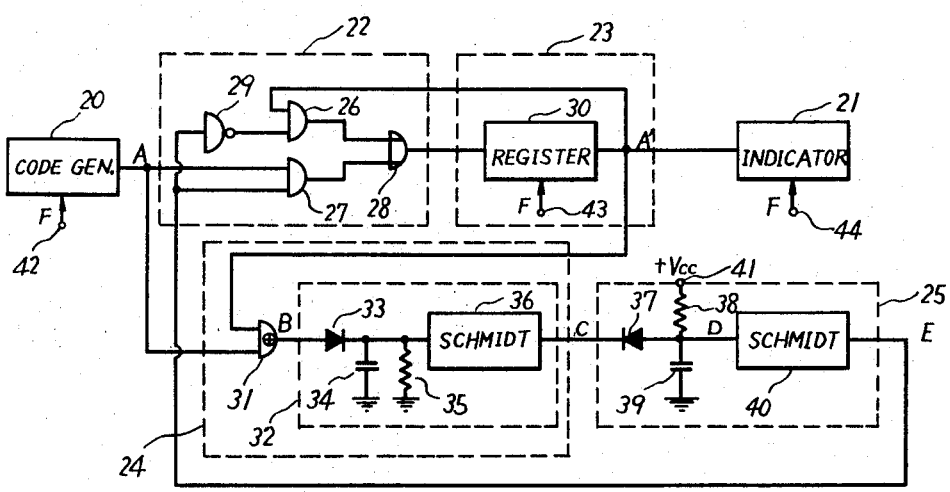
Figure 5:
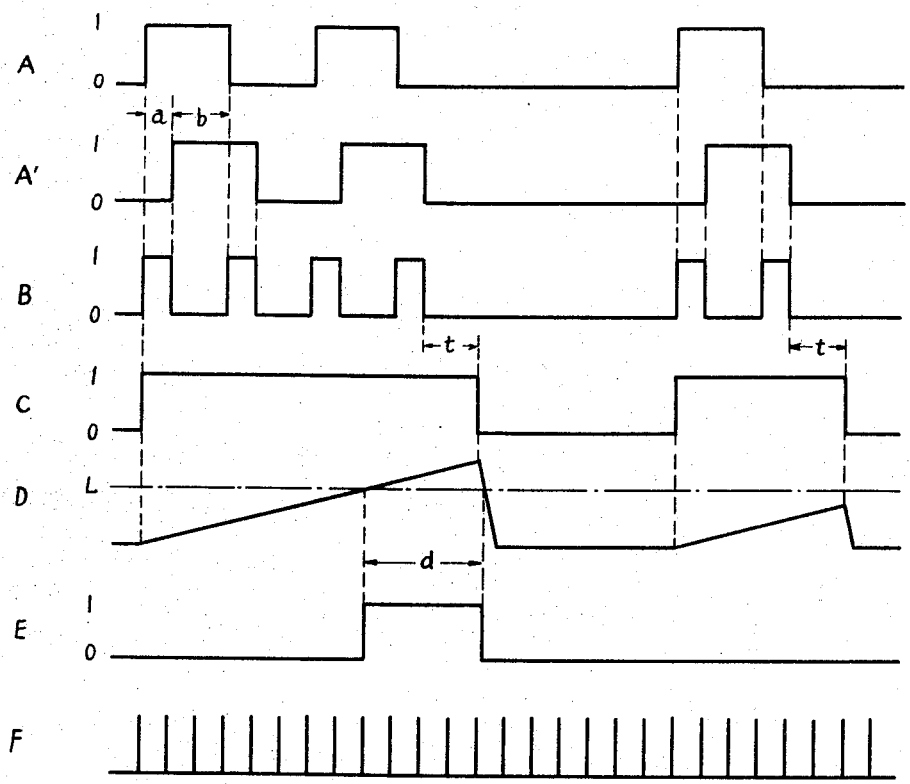
Figure 2:
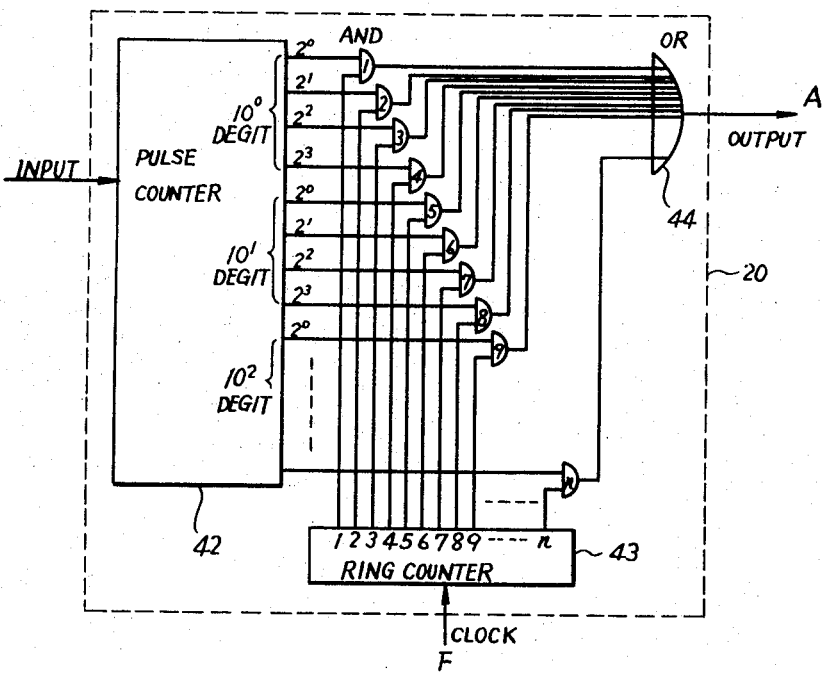

In the drawings:

FIG. 1 is a schematic diagram representing a digital balance of a prior art structure, FIG. 2 is a schematic circuit diagram partially in block form showing an example of the code generator of FIG. 1, FIG. 3 is a block diagram representing a basic configuration of a digital balance according to this invention, FIG. 4 is a circuit diagram representing partially in block form an embodiment of digital balance of this invention, and FIG. 5 is a waveform diagram illustrating the operation of the embodiment of FIG. 4.

Throughout the drawings, like reference numerals are used to denote corresponding structural components.

Referring now to FIG. 1 representing the basic structure of a digital balance of the prior art, a cradle 2 carrying an article 1 to be weighed is supported by a vertical stay 3 which is coupled with two parallel links 4 and 5 at pivots 7 and 8, the other ends of the links 4 and 5 being pivoted at 9 and 10 to a fixed base 6 to form a so-called Roverval mechanism. The vertical stay 3 has a horizontal lower portion 11 which is coupled to a fixed base 13 by a spring 12, the spring force of which is balanced with the weight of the article 1 on the cradle 2. The horizontal portion 11 is coupled through a rack 14 and pinion 15 to a rotary code plate disc 16 having a circumferential pattern consisting of alternate transparent and opaque stripes. The circumferential pattern serves the function of an optical gate and a light beam emitted from a lamp 17 passes this gate and a slit 18 and is sensed by a photoelectric element 19. The output of the photoelectric element 19 is processed in a code generator 20 and converted into a desired digital code which is indicated by a known digital indicator 21. The code generator 20 is well known in the art and an example thereof is shown in FIG. 2.

In operation, the cradle 2 is moved downwardly by the weight of the article 1 until the weight is balanced by the force of the spring 13. This vertical movement of the cradle is converted into rotary movement of the code plate disc 16 by means of the rack-and-pinion mechanism and further into a binary pulse train by means of the photoelectric encoding mechanism consisting of the code plate disc 16, lamp 17, slit 18 and photoelectric element 19. The pulse train is applied to a pulse counter 42 (FIG. 2) of the code generator 20, which counts the binary pulses in the pulse train and produces binary-coded decimal code outputs, for example, as shown in FIG. 2. The outputs of the pulse counter 42 are respectively coupled with successive outputs of a ring counter 43 generated sequentially under control of a clock pulse F (FIG. 5) supplied from a clock generator (not shown) at respective AND gates whose outputs are gated together by an OR gate 44 and form a binary-coded decimal signal A (FIG. 5). The output signal A is supplied to the decimal indicator 21 and indicated as a decimal number. Such operations of the code generator 20 and the decimal indicator 21 are well known in the art and form no part of the subject matter of this invention.

It is apparent from the foregoing that the indication on the indicator 21 varies with the movement of the cradle 2 and its fluctuation is substantial when the movement is rapid, and this often causes considerable difficulty in reading the indication.

Referring to FIG. 3 representing a basic configuration of the fluctuation preventing circuit according to this invention, a code generator 20 and an indicator 21 which are the same as those in FIG. 1 and form no part of this invention are included and the weighing mechanism and encoding mechanism are omitted because these mechanisms may be the same as those of FIG. 1 and also form no part of the invention. Between the code generator 20 and the indicator 21, a normally closed control gate 22 and a temporary memory 23 are coupled in series, and the output of the code generator 20 and the output of the memory 23 are coupled to the input of a comparator 24 whose output is coupled through a timer 25 to the gate 22 as a control input therefor. The elements 22, 23, 24 and 25 constitute the fluctuation preventing circuit according to this invention.

The digital output of the code generator 20 passes the control gate 22 when it is opened, and enters the memory 23 to be stored temporarily therein. The stored code is indicated digitally by the indicator 21 and, at the same time, supplied to the comparator 24 together with the output code of the code generator 20. The comparator 24 is arranged to produce an output only when no coincidence exists between both input codes. The output of the comparator 24 is supplied to the timer 25 to initiate its operation and the timer 25 produces a control signal for the gate 22 after a predetermined lapse of time to open the control gate 22.

When the balance is in a balanced condition and the code generator 20 produces constantly a same digital code, coincidence exists between the output of the code generator 20 and the output of the memory 23 and no output is produced by the comparator 24. Therefore, the gate remains closed, no change takes place in the memory 23, and the indicator 23 continues indication of the same digital quantity.

When the balance sways and the output code of the code generator 20 varies, coincidence does not occur between both outputs of the code generator 20 and the memory 23 and the comparator 24 produces an output. The timer 25 initiates operation and after a predetermined lapse of time, produces an output which is applied as a control signal to the control gate 22, if the lack of coincidence between both outputs of the code generator 20 and the memory 23 is maintained at that time. The gate control 22 is opened by the output of the timer 25 to pass the output of the code generator to the memory 23 and the content of the memory 23 and, therefore, the indication of the indicator 21 are changed. If the same output code is produced continuously from the code generator 20, both outputs of the code generator 20 and the memory 23 coincide and the comparator 24 stops operation. Accordingly, the timer 25 is reset to stop the control signal to the control gate 22 and the gate 22 is closed. Thus, the renewed indication is maintained as it is.

Even when the lack of coincidence is sensed by the comparator 24 and the comparator 24 produces an output to the timer 25, if the balance recovers the original state and the coincidence reappears within the predetermined lapse of time of the timer 25, the timer 25 will not yet have produced the control signal and the gate 22 will not have opened. Therefore, the content of the memory 23 and indication on the indicator 21 are not renewed.

The above mentioned operation of the circuit of this invention means that if the predetermined lapse of time of the timer 25 is selected appropriately, it is possible to cause the indication on the indicator 21 to vary in accordance with a slow variation of the output code of the code generator as in the case of a normal weighing operation and, at the same time, cause the indication to be fixed against a quick change or fluctuation due to shock or sudden wind, for example.

FIG. 4 represents an embodiment of the fluctuation preventing circuit of FIG. 3 and, in the drawing, dashed blocks 22, 23, 24 and 25 correspond to the control gate 22, memory 23, comparator 24 and timer 25. The control gate 22 consists of two AND gates 26 and 27, an OR gate 28 and a NOT gate 29. The inputs of the AND gate 26 are supplied from the output of the memory 23 and from the output of the timer 25 through the NOT gate 29. The inputs of the AND gate 27 are supplied from the output of the code generator 20 and the output of the timer 25. The outputs of both AND gates 26 and 27 are coupled to the inputs of the OR gate 28 whose output is coupled to the input of the memory 23. The memory 23 consists of a shift register 30 having a sufficient capacity for storing the whole code corresponding to the measured value. The output of the memory 23 is coupled to the digital indicator 21 to indicate the content thereof. The comparator 24 consists of an exclusive OR gate 31 and a timer circuit 32 including a series connection of a forwardly poled diode 33 and a Schmidt circuit 36 and a parallel connection of a capacitor 34 and a resistor 35 connected between the cathode of the diode 33 and the reference potential point. The exclusive OR gate 31 is coupled to the outputs of the code generator 20 and memory 23 by its inputs and to the anode of the capacitor 33 by its output and the output of the Schmidt circuit 36 is coupled to the input of the timer 25. The timer 25 includes a series connection of a backwardly poled diode 37 and a Schmidt circuit 40, a resistor 38 connected between the series connection point and a point 41 of operation voltage +Vcc and a capacitor 39 connected between the series connection point and the reference potential point. The diode 37 is connected to the output of the comparator 24 and the Schmidt circuit 40 is connected to the control terminal of the control gate 22.

Now, the operation of the circuit of FIG. 4 will be described with reference to the waveform diagram of FIG. 5.

In operation, the clock pulse train F is applied to the terminals 42, 43 and 44 of the code generator 20, register 30 and indicator 21 respectively to synchronize operations thereof. When the gate 22 is closed and no input is supplied to the shift register 30, the content of the register 30 is circulated through the AND gate 26 and the OR gate 28 in the control gate 22 at a predetermined period according to the clock pulse F.

It is now assumed that the output $A$ of the code generator and the output $A'$ of the memory 16 are as shown in FIG. 5 and a non-coincidence occurs in a time period $a$, that is, $A = 1$ but $A' = 0$. As both outputs $A$ and $A'$ are applied to the inputs of the exclusive OR gate 31, the output of the gate 31 becomes 1 during the time period $a$. On the contrary, in the time period $b$ in FIG. 5, $A = A' = 1$ and, therefore, the output B of the gate 31 is 0. In the same way, the output waveforms $A$ and $A'$ produce the output waveform B of the exclusive OR gate 31 as shown in FIG. 5.

Defining 1 as a positive voltage, the output 1 of the exclusive OR gate 31 passes the diode 33 and charges up the capacitor 34 instantaneously, and the Schmidt circuit 36 produces an output 1. This output is maintained for a time period corresponding to the time constant $t$ of the timer circuit 32, which is determined by the values of capacitor 34 and resistor 35 and the operation level of the Schmidt circuit 36. Therefore, if the time period $b$ in FIG. 5 is less than the time constant $t$ of the timer circuit 32, the output waveform B of the exclusive OR gate 31 produces an output waveform C at the output of the comparator 24, as shown in FIG. 5. The time constant $t$ is selected to be greater than the time required for one circulation of the content of the shift register 30 through the gates 26 and 28.

When the output C is 1 and positive, it is blocked by the backwardly poled diode 37 in the timer 25, and the capacitor 39 begins to be charged up by the operation voltage +Vcc at the terminal 41 through the register 38. Thus, the input voltage D of the Schmidt circuit 40 is raised gradually at a fixed gradient determined by the values of resistor 38 and capacitor 39 but is reduced quickly due to discharge of the capacitor 39 through the diode 37 when the input C of the timer 25 becomes 0 which is defined as zero or negative voltage. Therefore, the input voltage waveform at the input of the Schmidt circuit 40 becomes as shown by D in FIG. 5. Assuming the operation level of the Schmidt circuit 40 as L in FIG. 5, the Schmidt circuit 40 produces an output 1 only during the time period $d$ wherein the input voltage D exceeds the operation level L and the output of the Schmidt circuit 40 becomes as shown by the waveform E in FIG. 5.

It will be found from a brief analysis of the combination of gates 26, 27, 28 and 29 in the control gate 22, that, when the output E of the timer 25 is 1, the output of the control gate 22 is equal to A regardless of the value of $A'$, that is, the control gate 22 is opened and the content of the shift register 30 and the indication on the indicator 21 are renewed if $A'$ is not equal to $A$, but that, when the output E is 0, the output of the control gate 22 is equal to $A'$ regardless of the value of $A$ and, therefore, the content of the register 30 and the indication are maintained as they are. The above mentioned condition clearly sets forth a novel and improved feature of the device of this invention namely that the indication is renewed when non-coincidence between the digital indication on the indicator 21 and the output of the code generator 20 continues for some length of time or such non-coincidence is repeated at times with a short coincidence interval as shown in the left half of FIG. 5, but is not renewed when the non-coincidence continues for only short time as shown in the right half of FIG. 5.

As described in the above according to this invention, the balance exhibits no fluctuation of indication when the cradle is suddenly moved by a shock or wind but can follow a substantial change of the weight without significant delay of response as in the case of a mechanical damper. The present inventive device can reduce not only the fluctuation of an indication but also erroneous typing of the measured value. In addition, if the device is inserted between the code generator and arithmetic unit in a digital balance having the function of calculating a total price from unit price and weight, improved reliability can be obtained by preventing incorrect calculation due to the fluctuation of the input code.

What is claimed is:

1. An output code fluctuation preventing device in a digital balance comprising mechanical balancing means, a code generator for converting an analog displacement into a digital code and indicating means for displaying said digital code, a normally closed gate and storage means interconnected between said code generator and said indicating means, a comparator interconnected with and comparing the outputs of said code generator and the output of said storage means and producing an output when a non-coincidence exists between said both outputs, and timing means connected to said comparator and said gate and operable in response to the output of said comparator to supply an output to said gate to open said gate at a predetermined time after the initiation of operation.

2. A device according to claim 1 wherein said normally closed gate consists of a first AND gate having an input coupled to the output of said code generator and another input coupled to the output of said timing means, a second AND gate having an input coupled to the output of said storage means and another input coupled through a NOT gate to the output of said timing means, and an OR gate having inputs respectively coupled to the outputs of said both AND gates and an output coupled to the input of said storage means, said storage means including a shift register, and said comparator includes an exclusive OR gate having an input coupled to the output of said code generator and another input coupled to the output of said storage means and a timer circuit having an input coupled to the output of said exclusive OR gate for maintaining the output level of said exclusive OR gate for a predetermined time.

* * * * *